(12) United States Patent
de Wit et al.

(10) Patent No.: US 9,964,465 B2
(45) Date of Patent: May 8, 2018

(54) SENSOR ASSEMBLY FOR BEARING WITH WIRELESS TEMPERATURE SENSOR

(71) Applicants: Frank de Wit, Noordeloos (NL); Defeng Lang, Delft (NL)

(72) Inventors: Frank de Wit, Noordeloos (NL); Defeng Lang, Delft (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/215,907

(22) Filed: Jul. 21, 2016

(65) Prior Publication Data

US 2017/0030804 A1 Feb. 2, 2017

(30) Foreign Application Priority Data

Jul. 21, 2015 (GB) .................................. 1512839.0

(51) Int. Cl.
*G01B 7/16* (2006.01)
*G01M 13/04* (2006.01)
(Continued)

(52) U.S. Cl.
CPC ............. *G01M 13/04* (2013.01); *F16C 41/00* (2013.01); *G01K 7/36* (2013.01); *G01K 13/00* (2013.01); *F16C 2233/00* (2013.01)

(58) Field of Classification Search
CPC ..... G01M 13/04; F16C 41/00; F16C 2233/00; G01K 7/36; G01K 13/00
(Continued)

(56) References Cited

U.S. PATENT DOCUMENTS

| 4,837,556 A * | 6/1989 | Matsushita ............ B64G 1/428 340/531 |
| 6,107,924 A * | 8/2000 | Kasai ..................... G01V 3/102 324/204 |

(Continued)

FOREIGN PATENT DOCUMENTS

EP       1849013 B1       11/2011

OTHER PUBLICATIONS

Sensors 2008, vol. 8, Issue 12, Dec. 2008, Wang et al., "A Passive Wireless Temperature Sensor for Harsh Environment Applications."
(Continued)

*Primary Examiner* — Max Noori
(74) *Attorney, Agent, or Firm* — Bryan Peckjian; SKF USA Inc. Patent Dept.

(57) ABSTRACT

The invention relates to a sensor assembly for use in a bearing including at least one bearing cage configured to accommodate at least one rolling element of the bearing, the sensor assembly including a driven oscillator circuit providing a receiver, a function generator and a primary coil, and a passive oscillator circuit including a temperature dependent capacitance. The passive oscillator circuit is configured to be attached to the bearing cage such that the inductor coil interacts with the primary coil of the driven oscillator circuit. It is proposed that a directional coupler is provided in a signal line between a function generator and the primary coil of the system, wherein the directional coupler is arranged to output a signal reflected from the passive resonant circuit in the cage toward a tuned receiver receiving the feedback of the signals generated by the function generator.

13 Claims, 1 Drawing Sheet

(51) Int. Cl.
  *F16C 41/00*  (2006.01)
  *G01K 7/36*   (2006.01)
  *G01K 13/00*  (2006.01)
(58) Field of Classification Search
  USPC .......................................................... 73/766
  See application file for complete search history.

(56) References Cited

U.S. PATENT DOCUMENTS

| | | | |
|---|---|---|---|
| 8,770,836 B2* | 7/2014 | Burgard | G01K 1/024 340/10.1 |
| 2015/0255995 A1* | 9/2015 | Park | A61B 5/0031 307/104 |

OTHER PUBLICATIONS

Birck and NCN Publications, Paper 1089, 2011, Scott et al., "Wireless Temperature Microsensors Integrated on Bearings for Health Monitoring Applications."
Sensors, 2007 IEEE, Oct. 28-31, 2007, Kovacs et al., "Early-Warning Wireless Telemeter for Harsh-Environment Bearings."
Industrial Electronics, IEEE Transactions on, vol. 58, No. 2, Feb. 2011, Sample et al, "Analysis, Experimental Results, and Range Adaption of Magnetically Coupled Resonators for Wireless Power Transfer."

* cited by examiner

SENSOR ASSEMBLY FOR BEARING WITH
WIRELESS TEMPERATURE SENSOR

CROSS-REFERENCE TO RELATED
APPLICATIONS

This application claims priority to Great Britain (GB) patent application no. 1512839.0 filed on Jul. 21, 2015, the contents of which are fully incorporated herein by reference.

FIELD OF THE INVENTION

The invention relates to a bearing including a wireless temperature sensor according to the preamble of claim 1.

BACKGROUND OF THE INVENTION

It is known to provide bearings such as ball bearings or roller bearings with temperature sensors. For monitoring the bearing, heat generated at the interface of balls/rollers and the raceways is detected by a temperature sensor located as close as possible to this interface. This makes a cage of a bearing a desirable position for temperature measurement. However, a bearing cage is a rotating part and cannot be easily accessed and the available space is narrow. In particular for smaller bearings, it is difficult to integrate batteries or a generator into the bearing cage.

The document EP 1 849 013 B1 discloses a bearing having a cage equipped with a power receiving coil. A transmitter for sending a signal indicative of the sensed condition of the bearing to another antenna arranged on the outer race is integrated in the cage. However, this solution is feasible only for larger bearings with a cage capable of supporting the transmitter electronics.

Passive wireless temperature sensors for bearing cages have been proposed e.g. in the article "*A Passive Wireless Temperature Sensor for Harsh Environment Applications*", Sensors 2008, 7982-7995 by Ya Wang, Yi Jia, Qiushui Chen and Yanyun Wang. A passive oscillator circuit including a temperature dependent capacitance and an inductor can be arranged on a rotating element like a bearing such that the inductor coil interacts with a transmitter coil of a driven oscillator circuit. The temperature dependence of the capacitance results in a temperature dependence of the resonance frequency of the resonant circuit on the rotating element which can be measured. Similar systems have been investigated by S. Scott et al of the Purdue University.

The resonant circuit absorbs energy from the primary circuit with a coil such that the resonant frequency can be derived from an absorption peak in the frequency sweep. The method measures the energy missing at the oscillation frequency.

Typically, a function generator inserts a sine wave signal into a coaxial cable. At the location of the measurement, a T-splitter device splits the signal into a part going to the primary coil/transceiver coil and the part going to a receiver for carrying out the spectral analysis. The combination of primary coil and measurement coil in an area being measured absorbs a certain amount of energy at a certain frequency and this absorbed fraction is temperature-dependent. Whatever is left is supposed to reach the receiver. This method uses flux coupling between the coils as in a transformer. However, the method suffers from a low signal to noise ratio and from microphony caused by improper impedance matching.

Actually, only a part of the returning signal from the transceiver coil reaches the analyzing circuit of the receiver whereas another part returns into the generator and leads to a low signal to noise ratio.

The primary coil of the sensor is essentially a loop and thus a balanced-type electrical system, whereas the coaxial standard cable is unbalanced. The inherent issue is mismatching of the impedance of the system which causes microphony, i.e. the dependence on the outer circumstances such as vibrations or tolerances such that the output values will largely change. The microphony is mainly caused by reflected current flowing in the outer skin of a cable that can be influenced by touch or motion. This results in difficulties for calibration and reproducibility.

BRIEF SUMMARY OF THE INVENTION

It is the object of the invention to provide a bearing with integrated temperature sensing in a passive resonant circuit with a better signal to noise ratio. A further object of the invention is to create a measurement platform on the bearing cage respecting applicable space and weight restrictions while reliably transferring both energy and data.

The invention relates to a sensor assembly for use in a rolling element bearing having at least one bearing cage and a plurality of rolling elements arranged in the cage. The cage is part of a sensor assembly according to the invention, including a driven oscillator circuit including a receiver, a function generator and a primary coil, wherein the bearing cage includes a passive oscillator circuit including a temperature dependent capacitance and an inductor coil, the passive oscillator circuit being attached to the cage such that the inductor coil interacts with the primary coil of the driven oscillator circuit.

The invention proposes in particular to provide a directional coupler between a function generator and the primary coil of the system, wherein the directional coupler is arranged so as to output a signal reflected from the passive resonant circuit in the cage toward a tuned receiver receiving the feedback of the signals generated by the function generator. The receiver is used to detect the complex amplitude vector of the reflected signal. An analog-to-digital converting sampling system follows this receiver and can analyze the signal. Usually but not necessarily it will take an average over a period sufficient for the cage to go through at least one revolution, thus allowing removal of any repeating distance component and easing separation of the amplitude.

The invention is applicable to any kind of bearing having a cage capable of accommodating a passive circuit as defined above. It would be possible to use a metal cage itself as the inductor coil or embed the inductor coil into a groove or another kind of recess in a dielectric cage or to simply attach the coil to an outer surface thereof.

The driven oscillator circuit may be attached to the non-rotating ring of the bearing, to a bearing housing or at any suitable place nearby. The primary coil is preferably attached to one of the bearing rings, preferably the outer bearing ring, e.g. by being attached to a bearing seal or cap or integrated into the seal or cap such that a magnetic flux coupling between the primary coil and the inductor coil is sufficiently strong.

By sweeping the transmitter-receiver pair over a small frequency range in steps, frequency and amplitude pairs can be recorded. The oscillation frequency of the sensor circuit can be determined so that the corresponding temperature at the position of the capacitance can be measured.

The directional coupler prevents a loss of signal energy towards the functional generator and therefore leads to an increase of the signal to noise ratio. Basically, the directional coupler enables measuring the signal reflection rather than of dissipation such that a better signal to noise ratio is obtained.

In a preferred embodiment of the invention, both the primary inductor coil and the inductor coil of the passive resonant circuit extend over the entire circumference of the bearing cage. The flux can thus be maximized and a strong coupling between transceiver antennae and cage antennae can be obtained.

According to a further aspect of the invention, it is proposed to further provide a transformer, preferably in the form of a current mode balun, in a signal line comprising a coaxial cable between the directional coupler and the primary coil. Due to the balun, the coaxial cable can be balanced and microphony of the system can be reduced, i.e. the system is much less sensitive to condition changes, vibrations, tolerances or the like.

An analog-to-digital transformer can be used to digitize the signal and to enable using enhanced digital signal processing techniques.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE INVENTION

Figure 1:
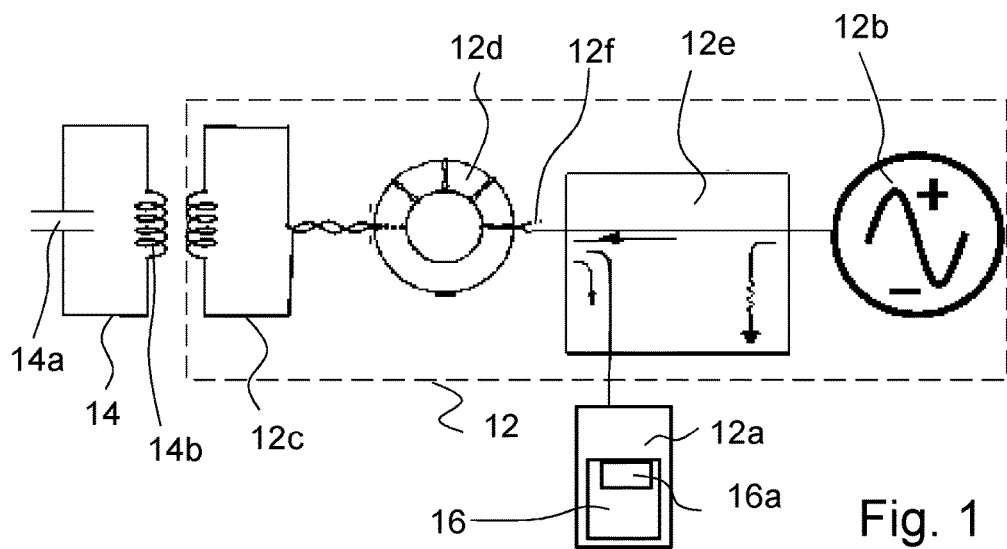
FIG. 1 is a schematic circuit diagram of a sensor assembly according to the invention for use in a bearing.

FIG. 1 illustrates a sensor assembly including a driven oscillator circuit 12 including a receiver 12a, a function generator 12b and a primary coil 12c. Further, the sensor assembly includes a passive oscillator circuit 14 including a temperature dependent capacitance 14a and an inductor coil 14b. The passive oscillator circuit 14 is configured to be mounted in a bearing cage 10 such that the inductor coil 14b interacts with the primary coil 12c of the driven oscillator circuit 12.

The driven oscillator circuit 12 may be attached to a non-rotating ring of the bearing, to a bearing housing or at any suitable place nearby. The primary coil 12c is preferably attached to one of the bearing rings, preferably the outer bearing ring, e.g. by being attached to a bearing seal or cap or integrated into the seal or cap (not shown).

According to the invention, a directional coupler 12e is provided in a signal line between a function generator 12b and the primary coil 12c of the system. The directional coupler 12e is arranged so as to output a signal reflected from the passive resonant circuit in the cage 10 toward a tuned receiver 12a receiving the feedback of the signals generated by the function generator 12b.

A transformer 12d configured as a current mode balun is provided at the end of a signal line comprising a coaxial cable 12f between the directional coupler 12e and the primary coil 12c. The transformer 12d balances the coaxial cable 12f such that the entire system including the coaxial cable 12f and the primary coil 12c becomes balanced.

A signal processing unit 16 configured to analyze the signal received by the receiver 12a is provided and includes an analogue-to-digital converter 16a receiving the output of the receiver 12a. The signal processing unit 16 is configured to calculate an average of the signal over a period sufficient for the cage 10 to go through at least one revolution in relation to a non-rotating ring, thus allowing removal of any repeating distance component and easing separation of the amplitude. The signal processing unit 16 is used to detect the complex amplitude vector of the reflected signal and to analyze the signal.

By sweeping the function generator-receiver pair over a small frequency range in steps, a set of frequency-and-amplitude pairs can be recorded. A peak in the oscillation frequency spectrum of the sensor circuit can be determined as the resonant frequency, so that the corresponding cage temperature is measured.

Figure 2:
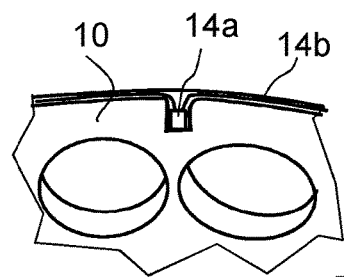
FIG. 2 is a detail of a cage of the sensor assembly according to the invention.

FIG. 2 illustrates a detail of the bearing cage 10 equipped with the passive resonant circuit 14 according to the invention. Both the primary coil 12c and the inductor coil 14b of the passive resonant circuit extend over the entire circumference of the bearing ring or bearing cage 10 and are arranged coaxially in close proximity to each other. The inductor coil 14b is mounted in a notch 10a on an axial side surface of the bearing cage 10. The same side surface includes a slightly larger recess 10b accommodating the capacitor 14b.

The design according to the preferred embodiment of the invention uses a separate primary oscillator as the function generator 12b inserting its energy in a single winding of the primary coil 12c (or antenna) via the above described special system having the directional coupler 12e and the transformer 12d (current mode balun) as illustrated in FIG. 1.

When employing a primary circuit, the energy inserted in the primary coil 12c can either go in the air or be reflected via the transformer 12d into the directional coupler 12e.

One of the functions of the directional coupler 12e is to prevent that a part of the reflected energy goes back to the function generator circuit as far as possible and to add an extra output offering that reflected energy. This is then guided into the tuned receiver 12a.

The advantages in comparison with the prior art include a better signal to noise ratio and reduced sensitivity to condition change, i.e. microphony.

The invention claimed is:

1. A sensor assembly used in a rolling element bearing including at least one bearing cage configured to accommodate at least one rolling element of the bearing, the sensor assembly comprising:
   a driven oscillator circuit configured to be attached to a stationary element of the bearing, the driven oscillator circuit including;
      a primary coil configured to interact with a passive oscillator circuit,
      a function generator configured to generate signals to be transmitted to a passive oscillator circuit by the primary coil,
      a tuned receiver configured to receive a feedback signal corresponding to the signals generated by the function generator and reflected from the passive oscillator circuit:
   the passive oscillator circuit including an inductor coil and a temperature dependent capacitance, the passive oscillator circuit being configured to be attached to the bearing cage such that the inductor coil interacts with the primary coil of the driven oscillator circuit, and a directional coupler is provided in a signal line between the function generator and the primary coil of the driven oscillator circuit system, wherein the directional coupler is arranged to output the feedback signal reflected from the passive oscillator circuit in the cage toward the tuned receiver.

2. The sensor assembly according to claim 1, further comprising a transformer in a signal line having a coaxial cable between the directional coupler and the primary coil.

3. The sensor assembly according to claim 2, wherein the transformer is configured as a current mode balun.

4. The sensor assembly according to claim 1, further comprising a signal processing unit configured to analyze the feedback signals received by the tuned receiver.

5. The sensor assembly according to claim 4, wherein the signal processing unit is configured to calculate an average of the signal over a period sufficient for the cage to go through at least one revolution in relation to a non-rotating ring of the bearing.

6. The sensor assembly according to claim 1, further comprising an analogue-to-digital converter receiving an output of the tuned receiver.

7. The sensor assembly according to claim 1, wherein both the primary coil and the inductor coil are configured to extend over an entire circumference of the bearing cage.

8. A bearing comprising:
a sensor assembly, the sensor assembly including at least one bearing cage configured to accommodate at least one rolling element of the bearing,
a driven oscillator circuit configured to be attached to a stationary element of the bearing including
a primary coil configured to interact with a passive oscillator circuit,
a function generator configured to generate signals to be transmitted to a passive oscillator circuit by the primary coil, and
a tuned receiver configured to receive a feedback signal corresponding to the signals generated by the function generator and reflected from the passive oscillator circuit:

the passive oscillator circuit including an inductor coil and a temperature dependent capacitance, the passive oscillator circuit being configured to be attached to the bearing cage such that the inductor coil interacts with the primary coil of the driven oscillator circuit, and a directional coupler is provided in a signal line between the function generator and the primary coil of the driven oscillator circuit, and wherein the directional coupler is arranged to output a feedback signal reflected from the passive resonant oscillator circuit in the cage toward the tuned receiver.

9. The sensor assembly according to claim 7, wherein the primary coil and inductor coil are coaxial.

10. The sensor assembly according to claim 1, further comprising:
a notch in an axial surface of the bearing cage, wherein the inductor coil is configured for mounting in the notch.

11. The sensor assembly according to claim 10, further comprising:
a recess in the axial surface of the bearing cage, the recess being relatively larger than the notch, wherein the primary coil is configured for mounting in the recess.

12. The sensor assembly according to claim 1, wherein the rolling element bearing further comprises at least one non-rotating element, and
the driven oscillating circuit is configured to be attached to the non-rotating element.

13. The sensor assembly according to claim 1, wherein the function generator generates signals corresponding to a range of frequencies and the passive oscillating circuit reflects the signal towards the active oscillating circuit,
the feedback signal reflected from the passive oscillating circuit to the receiver includes oscillation frequency data corresponding to the range of frequencies, and
the receiver determines the oscillation frequency associated with the highest amplitude allowing the temperature of the cage to be measured.

* * * * *